(12) United States Patent
Pecnik

(10) Patent No.: US 9,004,397 B2
(45) Date of Patent: Apr. 14, 2015

(54) AUTONOMOUS STRATOSPHERIC UNMANNED AIRSHIP

(75) Inventor: Bojan Pecnik, Zagreb (HR)

(73) Assignee: Hipersfera D.O.O., Zagreb (HR)

( * ) Notice: Subject to any disclaimer, the term of this patent is extended or adjusted under 35 U.S.C. 154(b) by 313 days.

(21) Appl. No.: 13/817,891

(22) PCT Filed: Aug. 19, 2011

(86) PCT No.: PCT/HR2011/000032
§ 371 (c)(1),
(2), (4) Date: Feb. 20, 2013

(87) PCT Pub. No.: WO2012/025769
PCT Pub. Date: Mar. 1, 2012

(65) Prior Publication Data
US 2013/0146703 A1    Jun. 13, 2013

(30) Foreign Application Priority Data

Aug. 27, 2010    (HR) .............................. P 20100468 A

(51) Int. Cl.
*B64B 1/06* (2006.01)
*B64B 1/08* (2006.01)
*B64B 1/30* (2006.01)
*B64B 1/58* (2006.01)

(52) U.S. Cl.
CPC ... *B64B 1/08* (2013.01); *B64B 1/06* (2013.01); *B64B 1/30* (2013.01); *B64B 1/58* (2013.01); *B64C 2201/022* (2013.01); *B64C 2201/122* (2013.01); *B64C 2201/127* (2013.01)

(58) Field of Classification Search
CPC .............. B64B 1/06; B64B 1/08; B64B 1/14; B64B 1/24; B64B 1/26; B64B 1/28; B64B 1/30; B64C 2201/122; B64C 2201/127
See application file for complete search history.

(56) References Cited

U.S. PATENT DOCUMENTS

| 5,645,248 | A  | 7/1997  | Campbell |
| 6,966,523 | B2 | 11/2005 | Colting  |
| 7,055,777 | B2 | 6/2006  | Colting  |
| 2005/0173591 | A1 | 8/2005 | Colting |
| 2006/0117675 | A1 | 6/2006 | Herrmann |

FOREIGN PATENT DOCUMENTS

DE    10 2005 013 529 A1    6/2007

OTHER PUBLICATIONS

International Search Report and Written Opinion for PCT Application No. PCT/HR2011/000032 mailed Dec. 27, 2011.

*Primary Examiner* — Philip J Bonzell
*Assistant Examiner* — Nicholas McFall
(74) *Attorney, Agent, or Firm* — RatnerPrestia

(57) ABSTRACT

An autonomous stratospheric unmanned airship with an operating altitude from 5-22 km and with a multi-month operational cycle. Spheroid rigid geodesic frame of constant volume formed by a multitude of struts, with an outer envelope enclosing the frame defining the eigenfrequency spectrum of the airship above 20 Hz, with vibrational amplitudes between 0.1 and 1 cm. Independently controllable electrical propulsion units, attached to the frame in the horizontal plane passing through the center of mass, can change the direction and value of the thrust vector. Buoyancy is controlled with a system integrated inside the geodesic frame including buoyant fluid pressurized tanks, valves for the release of the buoyant fluid through the buoyant fluid conduit into the buoyant gas cell which fills the geodesic frame. Valves at the subsystem support platform enable ambient atmosphere to fill the internal volume of the frame not occupied by the buoyant gas cell.

7 Claims, 6 Drawing Sheets

AUTONOMOUS STRATOSPHERIC UNMANNED AIRSHIP

CROSS REFERENCE TO RELATED APPLICATIONS

This application is the U.S. National Phase Application of PCT Application No. PCT/HR2011/000032, filed Aug. 19, 2011, which claims priority to Croatian Application No. P20100468A, filed Aug. 27, 2010, the contents of such applications being incorporated by reference herein.

TECHNICAL FIELD

An aspect of the invention is an autonomous stratospheric unmanned airship, with a rigid hull in a geodesic frame form. Specifically, the object of the invention refers to an improved character of the vehicle's buoyancy and the attitude control, as well as altitude stabilization with minimizing the influence of intrinsic vibrations to the payload and equipment with a special hull construction and adequate placement of the propulsion system.

Technical Problem

An aspect of the invention solves forming of the autonomous unmanned airship with an operational cycles spanning several months, placed in the stratosphere (~21 km), which can reach a maximum ground-speed of up to 60 km/h, and can take-off and land with minimal ground crew and landing strip requirements.

The first technical problem to be solved with the invention is the construction of the propulsion system of the unmanned airship for the flight at the operational altitude from 5 to 22 km, having comparatively decreased vibrations caused by maneuvering and by the environment, comparing to the non-rigid and semi-rigid state of the art airships.

The second technical problem to be solved with the invention is an enhanced maneuverability comparing to the classical airships, evident in the low-speed maneuverability.

The third technical problem to be solved with the invention is a construction of a buoyancy control system, which reliably enables buoyancy control with a pressure force balance at the airship's hull.

The fourth technical problem to be solved with the invention is an increased security in case of a loss of the buoyant fluid.

PREVIOUS STATE OF THE ART

For a number of applications it would be desirable to have a relatively stationary high-altitude platform. Those applications range from broadband telecommunication relays (internet, phone, TV), to remote sensing platforms, to scientific platforms, to (space) technology validation platforms, and others. Some of those applications, e.g. remote sensing, would additionally benefit from the platform which is very stable, i.e. has low hull oscillations in sub-Hz to tens-of-Hz range. Higher frequency vibrations with amplitude range in millimeters to centimeters, if present, can be effectively dealt with relatively simple contraptions such as elastic foam sheets, spring suspensions, and/or with various configurations of other lightweight shock-absorbers.

As known in the field (see e.g. general physics handbooks), dampening of the low-frequency mechanical oscillations (bellow Hz to few tens of Hz) would require bulky and massive gyro-systems which are unpractical for the stratospheric airships It is therefore important to reduce the intrinsic low frequency vibrations through the overall design features of the airship, and thus optimize the airship platform for the use of vibration-sensitive applications.

A number of options for said high-altitude platforms exists. Geostationary and low-orbit satellites are typically quite complex, practically impossible to service, and very expensive. In addition, geostationary satellites are too far away for high resolution remote sensing, and low-orbit satellites cannot stay fixed above the certain ground location and they have a short life-span.

Aside from satellites, several other concepts could serve as atmospheric high altitude platforms. Heavier than air vehicles (aircraft or flying wing drones) tend to have problems with endurance and with airflow required for attitude control at stratospheric altitudes, where the density of the atmosphere is significantly reduced. Free balloons will tend to drift away from the desired location, while tethered balloons are impractical due to the tether weight and the danger to the aerial traffic.

Airships require much less energy for flying than airplanes, and can effectively deal with reduced buoyancy of the rarefied stratospheric atmosphere through their sheer volume. Airships were widely used before 1940, but with the rapid development of the aircraft and several fatal accidents of hydrogen-filled dirigibles, the development and use of airships severely declined. Recent development of modern materials, availability of helium, as well as dramatic rise of the jet fuel price revived interest in use of the airships for the aforementioned purposes.

Stratospheric airships combine some of the best properties of geostationary satellites and ground-based towers. If located in the part of the stratosphere with stable and mild atmospheric conditions (typically at the height of around 21 km, but may vary slightly according to geographical position and season), stratospheric airships provide large ground footprint (thousands of square kilometers), but can also be recalled to the ground for maintenance or upgrade.

Documents U.S. Pat. No. 6,966,523 and U.S. Pat. No. 7,055,777 (inventor Hokan S. Colting) discuss the airship. Said documents conclude that modern airships that rely on the buoyancy of a lifting gas may tend to suffer from a number of disadvantages, such as:

(a) The Poor low-speed maneuverability (partially solved with lateral thrusters);
(b) The need for relatively large ground-crews for take-offs and landings;
(c) the need for relatively large fields from which to operate;
(d) complicated and expensive mooring (parking) infrastructure; and
(e) susceptibility to damage in turbulent atmospheric conditions.

According to U.S. Pat. No. 6,966,523 and U.S. Pat. No. 7,055,777 many, if not all of these disadvantages appear to stem from the fundamental shape and configuration of traditional airships—that is, the characteristic elongated, finned hull. Additional issues for traditional airships are control challenges with the expansion of the ballonets, and "porpoising" due to low stratospheric density and thus insufficient airflow over control surfaces at low speeds. The object of the invention, in contrast to the invention disclosed in U.S. Pat. No. 6,966,523 and U.S. Pat. No. 7,055,777, has a rigid geodesic hull and a different implementation of the propulsion system. The rigid geodesic hull, for the present invention, defines a different intrinsic vibrations spectrum which is dominated by higher frequencies and is more easily dampened with standard mechanical means for vibration dampening. Furthermore, the placement and distribution of the propulsion units in the horizontal plane of the lowered center of mass contributes to significantly improved maneuverability and to an additional decrease of the airship vibrations.

A spheroid airship may have a number of advantages over an elongated, finned airship. A spheroid airship is finless, and therefore does not depend on a relatively high airspeed to maintain flight control. With equal thrust on both engines the airship can be flown in a straight line. Increasing (or decreasing) the thrust on one side, causes the airship to turn. A spherical airship is highly maneuverable even at low speed or when hovering, regardless of the local atmospheric density. Besides, these conclusions are easy to find in other documents on the state of the art.

The document U.S. Pat. No. 5,645,248 (inventor J. Scott Campbell) discusses spheroid rigid hull airship with a geodesic hull with a possibility to control the air current, with e.g. motors placed outside of the hull (FIG. 7). The difference between U.S. Pat. No. 5,645,248 and the present invention is in the position and distribution of propulsion units and in a way of realization of buoyancy and control. Specifically, U.S. Pat. No. 5,645,248 discusses construction which uses a ballast fluid shifted through at least two ballast tanks, to help the control of the orientation of the air pathway. Said design bears several disadvantages against the present invention. Ballast liquid is required, thus its mass either reduces the payload mass capacity or requires an airship with a larger buoyancy to accommodate for the payload with the same mass. Additionally, shifting of liquid through ballast tanks in order to change the center of mass of apparatus may tend to induce low frequency structural oscillations (in sub-Hz to a few HZ range), which are difficult to damp. Similar type of frequency oscillations will be induced because, in general, propulsion unit is not positioned in the center of mass plane of the airship—which has been carefully implemented in the present invention. Furthermore, such an apparatus significantly changes the orientation of its vertical axis to control its orientation and movement. Airship applications such as remote sensing, or other applications where payload orientation is important, would thus require complex, and likely massive, leveling contraption in order to continuously preserve the desired payload orientation.

Although stratospheric wind conditions are relatively mild comparing to troposphere, winds up to ten meters per second or more are relatively common. These winds may tend to cause low frequency vibrations (as a non-restricting example typically from sub-Hz to few tens of Hz) in the structure of the airship, both directly through the interaction with the hull, and indirectly through interaction of the hull with the propulsion system, as the airship maneuvers against the drift to stay within its designated area.

Non-rigid and semi-rigid airships, even spherical or of spheroid shape, may tend to be significantly more influenced by such low frequency vibrations than comparable rigid airships, oscillation modes are similar to oscillations of the water droplet, i.e. they have a wide spectrum of spherical harmonics which propagate along the surface. Some of the envisioned applications for airborne stratospheric platforms, such as continuous remote sensing, are particularly sensitive to this type of vibrations, hence the desirability of the present rigid hull invention comparing to the known solutions in the technical field, because of the shift of the intrinsic vibration spectrum toward higher frequencies.

An overview of the relevant projects can be found in e.g. in German Pat. DE102005013529A1. For an update and completeness, several more projects are worth mentioning:

AeroSphere: 21th Century Airships, Inc., TechSphere Systems International, Inc., USA;
Global Observer: AeroVironment, Inc., USA;
HiSentinel: Aerostar International, Inc., USA;
sKARI: Korea Aerospace Research Institute, S. Korea;
Stratellite: GlobeTel Communications Corp., USA; i
X-Station: StratXX Holding AG, Switzerland.

SUMMARY OF THE INVENTION

As noted, because of its spherical geodesic frame an aspect of the present invention provides better stability and significantly reduced low frequency oscillations (from sub-Hz to tens of Hz) over non-rigid and semi-rigid airships and over airships having a propulsion unit placed in a pathway within (or adjunct to) the frame.

An aspect of the present invention also enables convenient placement of the propulsion units at the center-of-mass plane of the airship (or in its immediate vicinity). This is achieved through attaching propulsion units at the appropriate locations on the geodesic frame of the airship. Said propulsion mounting further reduces low frequency oscillations of the apparatus, typically in the Hz to tens of Hz range, which is well known in the field when calculating moments of inertia whilst moving around own rotational axis. Thus a first technical problem is solved.

In addition, using four (or more) propulsion units on a spheroid ship have a number of advantages over just two propellers: (1) movement in any horizontal direction is possible without orienting the airship first in a specific direction, which is more energy efficient because in general wind direction and desired airship trajectory will not match (2) since the airship can move towards desired location using just any two (out of four available) propellers, additional two-point failure redundancy is added for horizontal propulsion (in comparison to the two-propeller design) (3) using four (or more) propellers instead of two, it is possible to achieve the same ground velocity with lower propeller rpm (revolutions per minute), which reduces vibrations on the payload area. Thus a second technical problem is solved.

It is also possible to comparatively increase safety by removing the load-bearing role from the outside envelope (and assign it to the geodesic hull frame), thus making outer envelope less prone to tearing even in the case of the envelope puncture. This allows use of thinner and hence lighter envelopes, and provides for more efficient management of the airship mass budget, whilst obtaining an additional degree of safety and robustness. Furthermore, the pressure inside of the buoyant gas cell is equal to the ambient pressure throughout the flight, which further decreases structural loads. Thus a third technical problem is solved.

Additionally, structural integrity of the present invention, provided with the spherical geodesic frame, will remain intact in the case of the significant and irreplaceable loss of buoyant gas. Hence, large surface to mass ratio will substantially slow down the descent of the airship and reduce the hazard in the event of the hard or crash landing. Thus, a fourth technical problem is solved.

BRIEF DESCRIPTION OF THE DRAWINGS

The invention is best understood from the following detailed description when read in connection with the accompanying drawing. Included in the drawings are the following figures.

DETAILED DESCRIPTION OF THE INVENTION

The description that follows, and the embodiments described therein, are provided by way of illustration of an example, or examples, of particular embodiments of the principles of the present invention. These examples are provided for the purposes of explanation, and not of limitation, of those principles and of the invention, in a manner which is clear to a person skilled in the art.

For the purposes of this description, it will be assumed that operating conditions are referenced to an ISA standard day, namely to a datum of atmospheric conditions at sea level on a 15° C. (59 F) day. Also for the purposes of description, the airship is thought of as having a vertical, or z-axis, a longitudinal, or x-axis, and a transverse or y-axis. In the preferred embodiment (with four propulsion units) the airship does not have a specific leading or trailing side, and x- and y-axis merely define horizontal plane. The force of gravity, and hence buoyancy, acts parallel to the z-axis.

Figure 1:
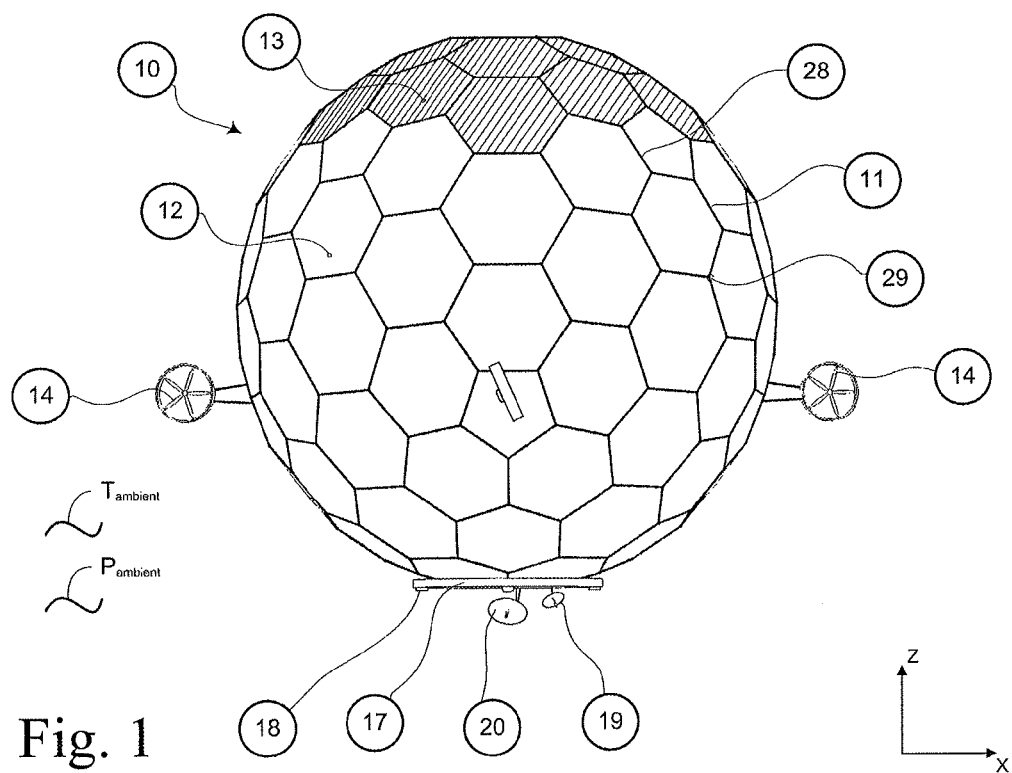
FIG. 1 is a schematic diagram of the LTA apparatus constructed according to the present invention.

In the embodiment of FIG. 1, a semi-rigid spherical airship is indicated generally as (10). Airship (10) has a load bearing geodesic frame (11) sheathed with an outer envelope (12), which in part carries photovoltaic cells (13), while the propulsion units have been fastened to the hull. At the bottom side of the frame (11) there is a subsystem support surface (17), constructed from strong and light materials as e.g. aluminum, carbon composite, plastic composite, Dyneema® composite, Kevlar® composite, etc. The support surface (17) is convenient for placement of the equipment from the outer side, while on the inside it is designed to house other functional systems of the ship (19), as will be clear from the text. Placement of the largest part of the ship's mass is at the support surface (17), at the bottom inner side of the frame (11) making the center of mass of the airship lower than the center of the frame (11). A low center of mass is important for the ship (10) to reduce the airship vibrations in the range from 0 to 10 Hz, which are caused by the propulsion units as well as by the interaction of the hull with the ambient environment.

Frame (11) comprises a geodesic spheroid having a number of struts (28). Each strut (28) is coupled between two connectors (29). Connection of the strut (28) and a connector (29) can be done in a number of ways known to one skilled in the art, depending on the type of the strut (28) material. In the preferred embodiment, the struts (28) and connectors (29) are constructed as a 6 frequency icosahedron geodesic frame (11). However, it should be readily appreciated by one skilled in the art that many other spherical or spheroidal patterns are available to achieve a similar LTA apparatus.

Each strut (28) can be made of tubular carbon composite. In this icosahedron geodesic frame of the present embodiment, all struts (28) have the same length (each approximately 350 centimeters in length and centimeters in width). In some other embodiment, struts (28) generally do not have the same length. Each strut (28) can be made of any variety of materials including aluminum, graphite composite, plastic composite, a Dyneema® composite, a Kevlar® composite, etc. The tensile strength of the carbon composite strut is about 1.4 GPa, providing the entire structure with an exceptional solidity.

The geodesic structure (11) is sheathed by an outer envelope (12). Outer envelope (12) is composed of tear- and UV-resistant fabric which can be, but is not limited to, Mylar®, or another biaxial polyester film, or a polypropylene film. In the present embodiment, outer envelope (12) is attached inside of the geodesic frame (11); pieces of the material identical to the outer envelope (12) are placed over the struts (28) and heat welded to the outer envelope (12). Outer envelope can also be attached inside of the geodesic frame (11) by placing an adhesive tape, such as 3M Clearviev®, from the outside of the apparatus and over the strut (28) and sealed onto the sheathing material. Other joining means may be used.

Buoyancy

Airship (10) aerostatic buoyancy is achieved through buoyant gas cell (38), containing LTA fluid, such as helium gas. Said buoyant cell (38) is occupying a part of the internal volume of the geodesic frame (11), while the rest is filled with atmospheric gas. Total gas pressure internal to frame (11) is required to always be equal to the outside environmental pressure, $P_{ambient}$. Said pressure equilibrium significantly reduces structural loads to the outer envelope comparatively to an equivalent super-pressurized outer envelope without the rigid frame. Equalization of internal and external gas pressure is done through valves (18), placed at the lower part of the hull, i.e. at the subsystem support surface (17).

Geodesic frame (11) volume is such that, at the operational altitude (typically ~21 km), buoyant cell (38) provides neutral buoyancy and occupies the most part of the hull, while the atmospheric gas fills the rest of the hull, to achieve pressure equilibrium with the environment. Buoyant cell (38) has a spheroidal shape when fully inflated, its volume being only marginally smaller than the inner volume of the hull. Marginally smaller in present embodiment means on the order of 1% of the hull's inner volume. Additional volume inside the frame (11) is left to allow for solar heating (and consequent expansion) of the buoyant cell (38) during daylight operation, with a margin for unforeseen contingencies. Hull volume not occupied by the buoyant cell (38)—up to 95% of the frame (11) volume at the sea-level and up to 1% of the frame (11) volume at the stratospheric operational altitude—is filled with the atmospheric gas. Buoyant cell (38) has lighter-than-air gas permeability which allows diffusion of less than 1% of the lighter-than-air gas per day.

In the preferred embodiment buoyant cell (38) is made from polyethylene. In another embodiment buoyant cell (38) is made from biaxial polyethylene film. In yet another embodiment, buoyant cell (38) is made from a laminate containing polyethylene film.

Diffusion from the buoyant cell (38) is compensated with the same kind of buoyant fluid, released by controlling individually the vents (24) from the pressurized tanks (23). Additionally, outer envelope can serve as an additional barrier impeding the said diffusion of the buoyant gas cell (38).

Airship (10) buoyancy is controlled through the amount of the buoyant fluid in the buoyant cell (38). If the buoyancy of the buoyant cell (38) is:
- equal to the total weight of the airship (10) in the gravitational field of the Earth at some altitude→airship (10) is maintaining current altitude; or
- larger than the total weight of the airship (10) in the gravitational field of the Earth at some altitude→airship (10) is ascending; or
- smaller than the total weight of the airship (10) in the gravitational field of the Earth at some altitude→airship (10) is descending.

To increase the airship (10) buoyancy, buoyant fluid is added to the buoyant cell (38) from the pressurized tanks (23). A change in the volume of the buoyant cell (38) is accompanied by the change of the amount of the atmospheric air within the frame (11) volume not occupied by the buoyant cell (38).

Figure 4A:
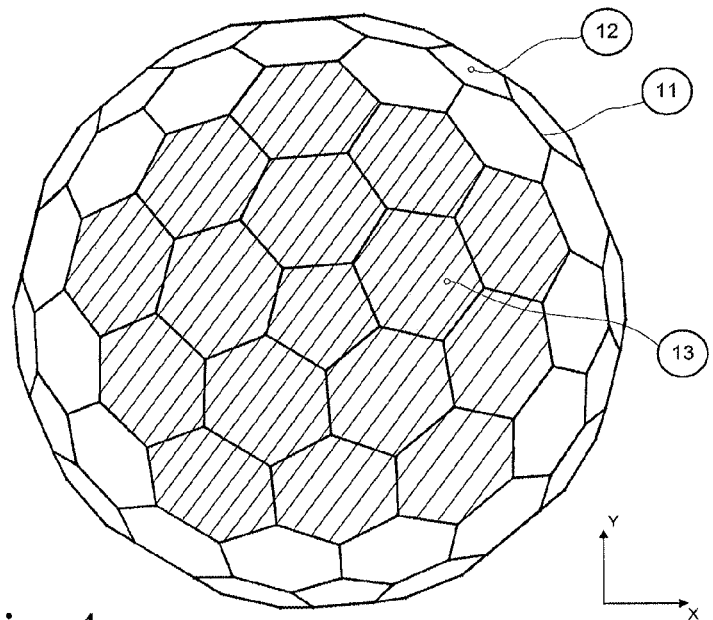
FIG. 4a is a schematic diagram of a top elevation of the airship of FIG. 1, showing the distribution of the photovoltaic cells.
Figure 4B:
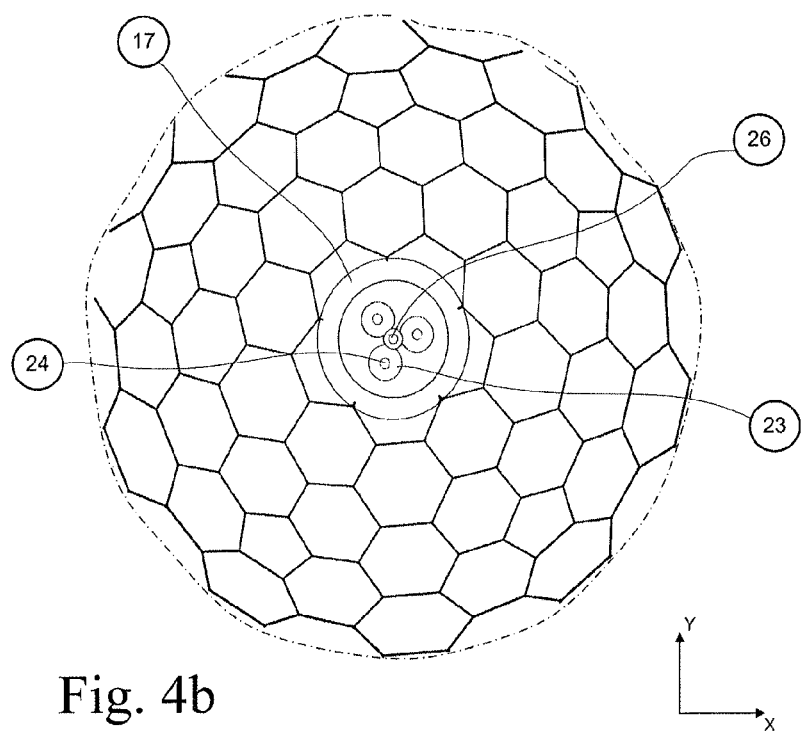
FIG. 4b is a schematic diagram of a top elevation of the airship of FIG. 1, with a scab section provided to highlight the placement of the airship parts used for the buoyancy control.

In a preferred embodiment, buoyant fluid is released from the pressurized tanks (23) through a valve (24), see FIG. 4b, at a pressure which is slightly higher than the environmental gas pressure. Such valves are commercially available. Buoyant fluid then passes through a fluid conduit (26), constructed e.g. as an vertical hollow cylinder, and is released into the buoyant cell (38). Such an operation leads to the airship (10) buoyancy increase. To ship (10) buoyancy, buoyant gas can be released directly into the environment as a neutral and harmless gas, using techniques well known to those skilled in the art. Because this solution is very obvious, it is not explicitly depicted in the figures of the preferred embodiment.

Said pressurized tanks (23) are located on the subsystems support surface (17) at the bottom inner part of the frame (11). Fluid conduit (26) is extending from the said pressurized tanks (23) into the buoyant cell (38), almost to the inner side of the top of the frame (11), FIG. 2a and FIG. 2b. Said fluid conduit (26) is wide enough (e.g. 10 cm) to enable unobstructed passage of depressurized gas from the gas tanks (23) into the buoyant cell (38).

In the preferred embodiment pressurized tanks (23) have spherical shape, and are made from carbon composites, such as Kevlar® or Aramid®, while said fluid conduit (26) is made from tubular carbon composite. Alternatively, said fluid conduit (26) can be manufactured out of the material identical to the one used for the buoyant cell (38).

Figure 3:
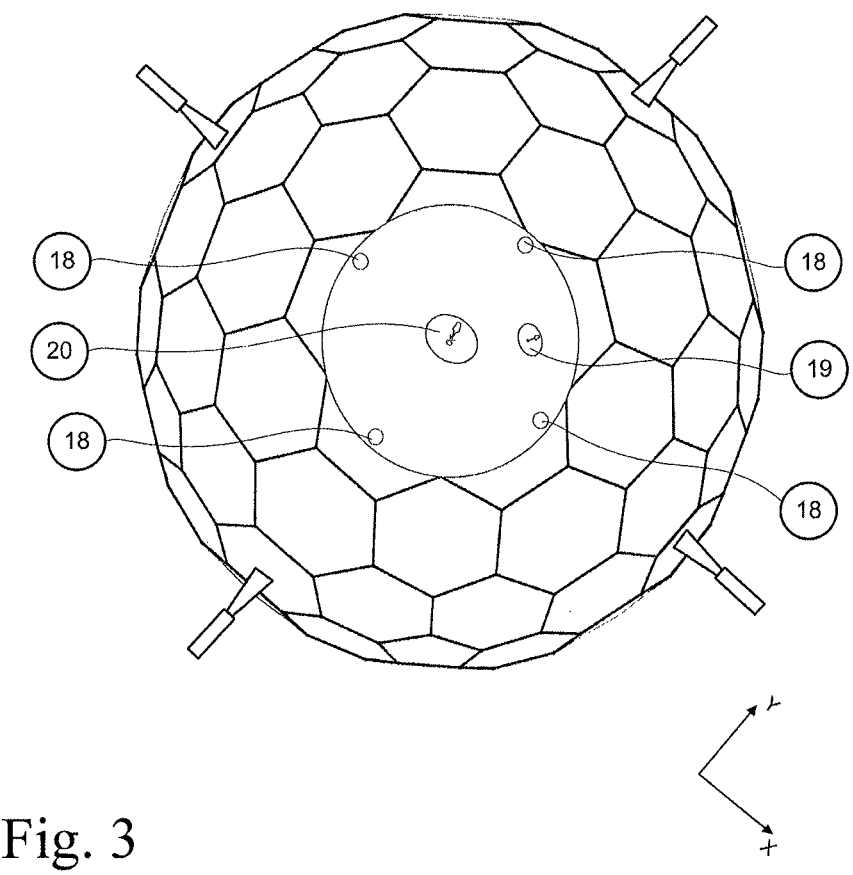
FIG. 3 is a schematic diagram of a bottom elevation of the airship of FIG. 1, viewed from below and showing the distribution of the propulsion units at the hull.

A flow of the atmospheric gas, in and out of the frame (11) volume not occupied by the buoyant cell (38), is facilitated through the atmospheric valves (18) located at the subsystem support surface (17), as shown in FIG. 3.

The buoyant gas cell (38) is attached to the top and to the bottom of the inner side of the frame (11) to the fixing point (25) around the bottom of the fluid conduit (26). This configuration facilitates smooth expansion of the said buoyant cell (38) into the frame (11) volume during ascent of the airship (10).

Figure 2A:
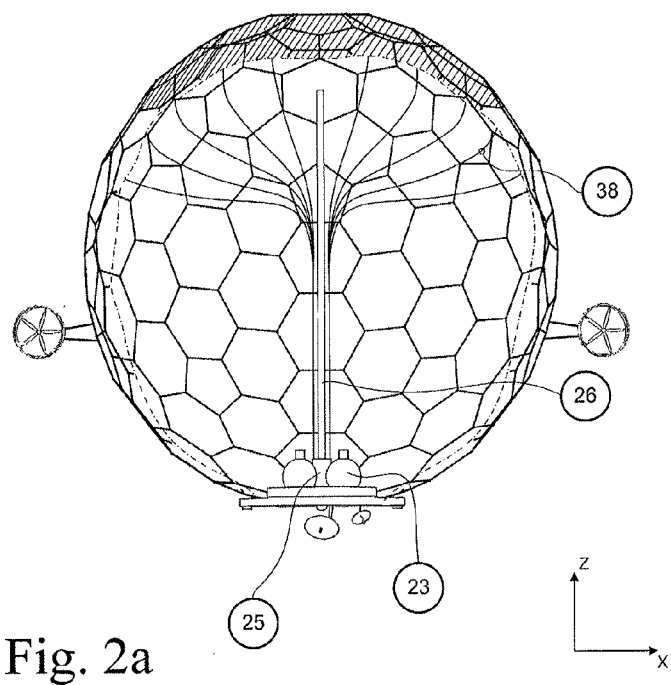
FIG. 2a is a schematic diagram of the LTA apparatus in a low altitude, with a scab section provided to show: a partially inflated buoyant fluid envelope, a system support surface, and buoyant fluid pressurized tanks.
Figure 2B:
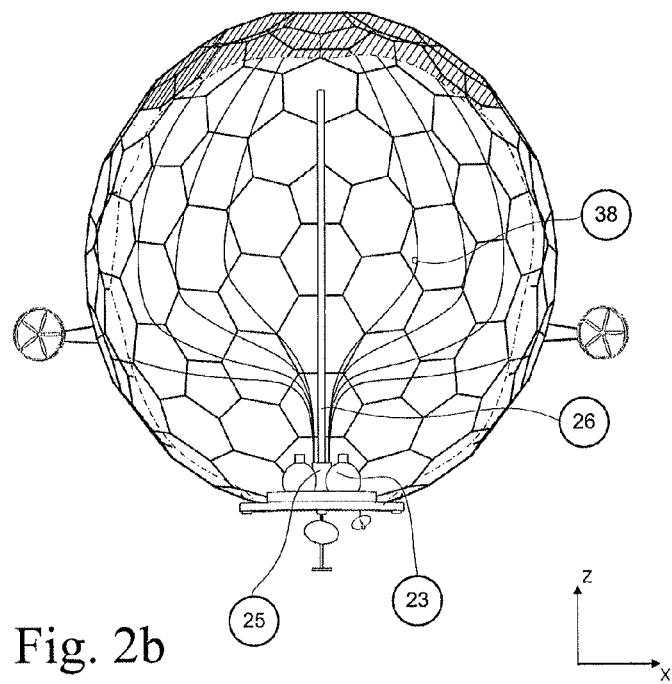
FIG. 2b is a schematic diagram of the LTA apparatus in a higher altitude, with a scab section provided to show: a more fully inflated buoyant fluid envelope, a system support surface, and buoyant fluid pressurized tanks.

Likewise, during the descent of the airship (10) said configuration of the buoyant cell (38) and frame (11) will facilitate smooth contraction of the buoyant cell (38). Smooth expansion and contraction of the buoyant cell (38) are required to minimize the chance of unforeseen folding of the buoyant cell (38), which could induce strain or even tearing of the said buoyant cell (38). FIG. 2a and FIG. 2b depict the buoyant cell (38), contracting and expanding together with elements for the ship (10) buoyancy control.

In the preferred embodiment, with ambient conditions at sea level during the 15° C. day, when the buoyant cell (38) is filled to 5-50% of its internal volume, buoyant cell (38) provides enough buoyancy to lift the airship (10).

Propulsion

Figure 5:
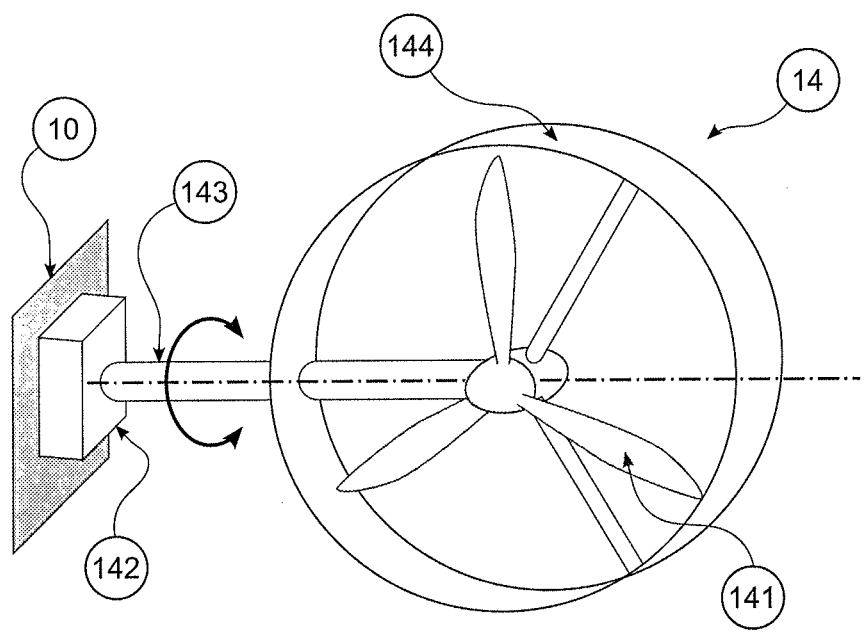
FIG. 5 is a schematic diagram of the propulsion unit with a propeller and a system to control the able of the trust vector.

In the preferred embodiment, see FIG. 5, every propulsion unit (14) consists of electromotor-driven propeller (141) to create a thrust force and of electromotor servo (142) controlling the tilt angle of the swivel frame (143). Tilting the swivel frame (143) tilts a electromotor-propeller assembly (141) and thus changes the direction of the thrust vector. Propeller's (141) rotational velocity controls the amplitude of the thrust vector. Tilting angles of the servo assembly (142) can be independently controlled for every propulsion unit (14). Airship's hull and propulsion unit's (14) immediate environment including people on the ground during take-off and landing, are protected from the propeller's rotation with nacelle (144). In the alternative embodiment, propulsion unit can use cycloidal drive.

The propulsion system of the airship (10), in the preferred embodiment, is realized with four propulsion units (14). However, propulsion system of the airship (10) in general is represented by two or more propulsion units (14) placed in the horizontal plane passing through the center of mass of the ship (10) calculated for a specific operational altitude. It is important to calculate the center of mass of the ship (10) because it depends on the state of the buoyant cell (38) and changes with the altitude. Swivel frames (143) of propulsion units (14) are placed in a way to have points of their connections with the electromotor servo drive (142) on the frame (11) forming tips of the regular polygon in the said horizontal plane passing through a center of mass. Such distribution of the propulsion units (14) decreases vibrational amplitudes of the hull of the ship (10) and simplifies the control by acting with a thrust vector, or more specifically with a moment of thrust force directly onto a center of mass in the horizontal plane of the ship's (10) own rotational axis.

In the preferred embodiment, airship (10) is capable of maintaining its position at the operational height, against the air current (wind) of up to sixty kilometers per hour, using just two propulsion units (14) situated on the opposite sides of the airship (10).

Uniformity of propulsion units (14) in embodiments with four or more units (14)—from which any two are sufficient for propulsion or control—significantly contributes to the reliability of the airship (10) operations. Namely, other propulsion units can completely take over the function of the faulty propulsion unit, due to ability to independently control thrust vector of each of the propulsion units (14) placed on the airship (10) in a way that the resulting cumulative thrust vector still points into a desired direction.

Energy

The airship (10) power system model is dimensioned according to the required nominal power input, conversion and storage losses, average and peak load requirements, to support the operations of the airship (10) throughout the diurnal cycle.

Airship onboard power and energy come from the array of batteries (32), mounted on the subsystem support surface (17). Batteries (32) have high power-to-mass ratio (at least 130 Wh/kg), and are immune to the battery memory effect over the period of at least 1000 recharging cycles. In the preferred embodiment, battery array is composed of plurality of Li—Po batteries.

Said battery array (32) is charged by the thin-film photo-voltaic cells (13) suspended on the upper part of the outer envelope (12), as shown in FIG. 4a. Said photo-voltaic cells (13) produce electric energy during the day, and their surface is large enough to support diurnal cycle of the airship according to the power system model.

Battery array can also be charged by the electric generator driven by an internal combustion engine, or a fuel cell. Person skilled in the art will appreciate that other means of additional generation of the electric current can be employed.

Communication

Figure 7:
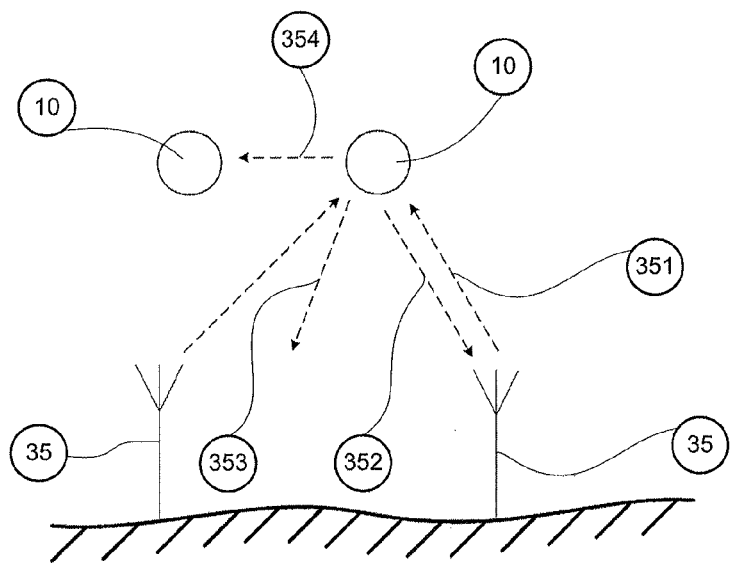
FIG. 7 is a schematic diagram of the communication modes of the airship from FIG. 1.

FIG. 7 shows different modes of communication of the ship (10) with its environment. The airship (10) communicates with the ground station (35) through the high-gain electromagnetic communication system (36) and the backup low-gain communication system (37). High gain (36) and low-gain (37) systems use high-gain (20) and low-gain (19) antenna, respectfully. The rest of the high-gain (36) and the low-gain (37) system is mounted on top of the inner side of the subsystem support surface (17).

Said high-gain communication system (36) supports the relay of the airship system data (352) (telemetry information, system control, and flight profile update) as well as the relay of the payload (34) information to the ground station (35). Additionally, said communication system can also relay (354) or reflect (353) information to the ground, with or without the signal amplifier.

In addition to the high-gain communication system (36), the independent low-gain communication system (37) supports the relay of the airship system data (352) to the ground station (35) as well as receiving the commands (351) from the ground station (35).

Control

Figure 6:
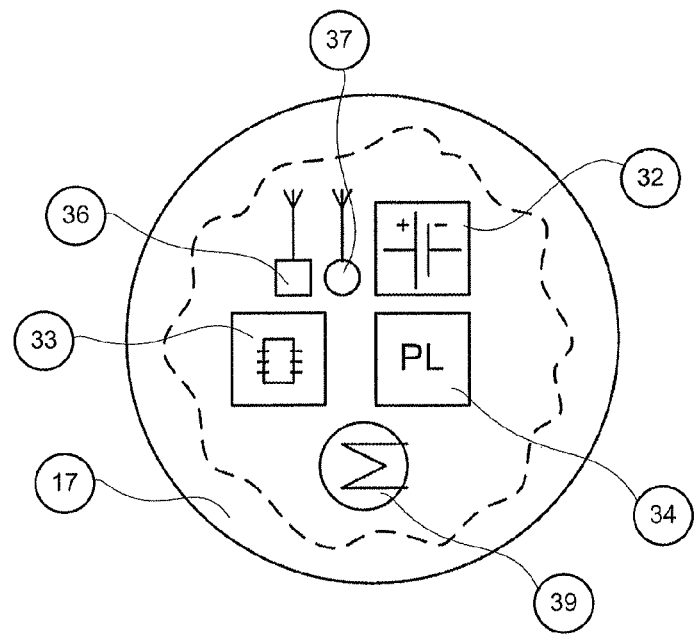
FIG. 6 is a schematic diagram of the subsystem support surface, including the parts enabling control and usage of the ship.

Operation of the airship subsystems is governed by the control unit (33), located at the subsystems support surface (17), as shown in FIG. 6. Control unit (33) is able to autonomously govern the airship (10) according to the preset flight profile throughout all phases of the flight, including take-off and landing. If necessary, preset flight profile can be updated through the communication (351) with the ground station (35), using any one of the available onboard communication systems. Multiple environmental (pressure, temperature, humidity, wind vane, anemometer) and positional (GPS, compass) sensors provide information for the control unit (33) to execute the preset flight profile. Control unit (33) can also be remotely controlled through the communication (351) with the ground station 35, using any one of the available onboard communication systems.

Control unit (33) has triple redundancy for added reliability in continuous and long-duration operations over populated areas. In the preferred embodiment, the triple redundancy of the control unit (33) is achieved by means of the high-availability (HA) cluster. An expert skilled in the art will notice that there are other methods of achieving high availability of the control unit.

Control unit (33) in addition is using information from some of the sensors (ambient, positional and inertial) to calculate the tilting angles and propellers speeds required for the achievement of the desired movement. Desired movement is calculated in the control unit (33) according to the flight profile or according to the remote control commands.

Purpose of the heaters (39) is to prevent possible temperature decrease in the control unit's (33) immediate environment below the declared operational temperature. The control assembly for the heaters (39) control is completely automatic.

Measurement and Supplementary Equipment

Payload (34) is also mounted on the subsystem support surface (17). Payload instruments can vary in character, but should include at least one of the following:

(i) Communication equipment capable of carrying out at least one of the following: receiving, sending, relaying or reflecting the communication signal;
(ii) Surveillance device from a set of the surveillance equipment, including at least one of the following: an optical camera, a mid-infrared ("thermal") camera, communication surveillance device, radar, lidar;
(iii) Scientific device from a set of the scientific equipment, including at least one of the following: an optical camera, a mid-infrared camera, spectrometer, photometer, anemometer; and
(iv) Technology-validation equipment, including an interface rack, and at least one device which must be able operate in space-like conditions and requires developmental testing.

As an additional characteristic, airship (10) subsystems are conceptualized for a continuous and long-term work in the environment set by the operational altitude (~21 km) of the airship without human presence. This characteristic, required with unmanned systems, is achieved, depending on the specifics of the subsystem in question, either through redundancy principle, or through use of components and assemblies of extremely high operational reliability.

REFERENCES

10—airship
11—geodesic frame
12—outer envelope
13—photovoltaic cell
14—propulsion unit
141—electromotor drive
142—electromotor servo
143—swivel frame
144—nacelle
17—subsystem support surface
18—valve
19—low-gain antenna
20—high-gain antenna
23—pressurized tank with buoyant fluid
24—individual valve for 23
25—fixing point for 38
26—buoyant fluid conduit
28—strut, element of 11
29—connector
32—battery array
33—control unit
34—payload
35—ground control station
351—system communication towards 10
352—system communication of 10 towards 35
353—reflecting of the received information
354—relaying of the received information
36—low-gain communication system
37—high-gain communication system
38—buoyant gas cell
39—electric heaters

The invention claimed is:
1. An autonomous stratospheric unmanned airship, comprising:
a spheroid rigid body of a constant volume derived from a geodesic frame formed from struts mutually connected with connectors and with a derived outer envelope enclosing the entire frame;
a propulsion system fixed to the frame;
a buoyancy control system integrated within the geodesic frame;

a power system comprising batteries within the geodesic frame and of photovoltaic cells placed at the upper part of the envelope;

a narrow-band and broadband communication system with corresponding antennas; and a control unit, wherein:

the propulsion system of the airship comprises two or more identical and independently controlled propulsion units placed in a horizontal plane passing through a center of mass of the airship calculated for a specific operating altitude where swivel frames of the propulsion units are placed in a way to have points of their connections with an electromotor servo drive on the frame forming tips of a regular polygon in the horizontal plane passing through a center of mass;

the buoyancy control system of the airship comprising: one or more pressurized tanks with buoyant fluid placed at a subsystem support surface lowering the center of mass of the airship towards the subsystem support surface, one or more valves for releasing the buoyant fluid through a fluid conduit into the buoyant gas cell which by expanding fills out geodesic frame; and one or more atmospheric valves placed at the subsystem support surface enabling the rest of the geodesic frame's volume to be filled with ambient atmosphere.

2. The autonomous stratospheric unmanned airship of claim 1, wherein each independently controllable propulsion unit comprises an electromotor drive with a propeller whose rotating speed defines the value of the vector of the thrust, protected with a nacelle, where said drive is placed at the swivel frame whose rotation around its longitudinal axis controls the angle of the drive through the use of the outer electromotor servo drive set on a frame, controlling the direction of the thrust vector.

3. The autonomous stratospheric unmanned airship of claim 1, wherein a buoyancy fluid conduit placed vertically inside the buoyant cell, axisimmetrically from the subsystem support surface till close to the top of the geodesic frame, while a flexible buoyant cell is additionally fixed to the said top of the geodesic frame above the buoyant fluid conduit and additionally to a fixing point done around the fluid conduit in a way that it is completely enclosed by the buoyant gas cell; enabling uniform expansion and contraction of the buoyant gas cell inside the geodesic frame.

4. The autonomous stratospheric unmanned airship of claim 1, wherein the number of the propulsion units being equal to, or larger than, four; and where independence of control of any propulsion unit increases the operational reliability of the airship during the eventual malfunction of one of the propulsion units.

5. The autonomous stratospheric unmanned airship of claim 1, wherein the spheroid geodesic frame constructed from struts defining a spectrum of the airship's eigenfrequencies in the frequency range above 20 Hz, with the vibrational amplitudes between 0.1 and 1 cm at the subsystem support base which are dampened with: elastic foam sheets, spring suspensions or with lightweight shock-absorbers, while using the measurement equipment susceptible to the said vibrational spectrum.

6. The autonomous stratospheric unmanned airship of claim 1, wherein the operating altitude is from five to twenty-two kilometers and the operational cycle is measured in months.

7. The autonomous stratospheric unmanned airship of claim 1, wherein having a payload placed at the subsystem support platform, and wherein the payload can be any of the following:
   a. Surveillance equipment comprised from optical and thermal cameras, communication monitoring devices, radar or lidar;
   b. Scientific optical and thermal cameras, spectrometers, photometers, interferometers and anemometers; and
   c. Test and measurement equipment for testing of technologies which must be able to operate in space-like conditions.

* * * * *